US011406475B2

(12) United States Patent
Donnet

(10) Patent No.: US 11,406,475 B2
(45) Date of Patent: Aug. 9, 2022

(54) POWDER CHAMBER, CLOSURE FOR A POWDER CHAMBER, AND POWDER SPRAYING DEVICE

(71) Applicant: FERTON HOLDING S.A., Delémont (CH)

(72) Inventor: Marcel Donnet, St Jean de Gonville (FR)

(73) Assignee: FERTON HOLDING S.A., Delémont (CH)

( * ) Notice: Subject to any disclaimer, the term of this patent is extended or adjusted under 35 U.S.C. 154(b) by 316 days.

(21) Appl. No.: 16/075,393

(22) PCT Filed: Feb. 3, 2017

(86) PCT No.: PCT/EP2017/052424
§ 371 (c)(1),
(2) Date: Aug. 3, 2018

(87) PCT Pub. No.: WO2017/134242
PCT Pub. Date: Aug. 10, 2017

(65) Prior Publication Data
US 2019/0038380 A1    Feb. 7, 2019

(30) Foreign Application Priority Data
Feb. 4, 2016    (DE) .................... 10 2016 201 693.8

(51) Int. Cl.
*A61C 3/025*    (2006.01)
*B24C 7/00*    (2006.01)
(Continued)

(52) U.S. Cl.
CPC ............ *A61C 3/025* (2013.01); *B24C 7/0046* (2013.01); *B24C 7/0069* (2013.01); *B24C 9/00* (2013.01); *B24C 1/04* (2013.01)

(58) Field of Classification Search
CPC ...... A61C 3/025; B24C 7/0046; B24C 7/0069; B24C 9/00; B24C 7/00; B24C 5/00; B24C 3/00; B24C 1/00
(Continued)

(56) References Cited

U.S. PATENT DOCUMENTS 3,704,811 A    12/1972  Harden
4,494,932 A *    1/1985  Rzewinski ............ B24C 7/0061
                                                        433/88

(Continued)

FOREIGN PATENT DOCUMENTS

DE    1773414 B1    10/1971
DE    19742701 A1    4/1998
(Continued)

OTHER PUBLICATIONS

Kreofsky, A, 'Taking Charge of Conductive Thermoplastic Technologies', published on Mar. 7, 2014, retrieved Jun. 3, 2021 from <URL: https://www.rtpcompany.com/wp-content/uploads/2014/03/Taking-Charge-of-Conductive-Thermoplastic-Technologies.pdf> (Year: 2014).*

(Continued)

*Primary Examiner* — Joseph J Hail
*Assistant Examiner* — Jonathan R Zaworski
(74) *Attorney, Agent, or Firm* — Cantor Colburn LLP

(57) ABSTRACT

A powder chamber, especially for or of a dental powder jet apparatus, including at least one conductive region, which is electrically conductive, where the at least one conductive region includes a contact surface, which is formed within the powder chamber.

11 Claims, 1 Drawing Sheet

(51) Int. Cl.
*B24C 9/00* (2006.01)
*B24C 1/04* (2006.01)

(58) Field of Classification Search
USPC ................................................ 451/89, 99
See application file for complete search history.

(56) References Cited

U.S. PATENT DOCUMENTS

| | | | |
|---|---|---|---|
| 5,181,349 A | 1/1993 | Schaffer | |
| 7,980,923 B2* | 7/2011 | Olmo | A61C 3/025 |
| | | | 451/99 |
| 9,050,704 B1 | 6/2015 | Liu | |
| 9,418,773 B2* | 8/2016 | Hermasch | C08K 3/041 |
| 2008/0023142 A1* | 1/2008 | Finster | B24C 7/0046 |
| | | | 156/345.33 |
| 2008/0233540 A1* | 9/2008 | Olmo | B24C 7/0046 |
| | | | 433/215 |

FOREIGN PATENT DOCUMENTS

| | | |
|---|---|---|
| EP | 0119021 A1 | 9/1984 |
| EP | 2193758 A1 | 6/2010 |
| WO | 2008067579 A1 | 6/2008 |

OTHER PUBLICATIONS

International Preliminary Report on Patentability for corresponding application PCR/EP2017/052424 filed Feb. 3, 2017; Report dated Feb. 2, 2018.

International Search Report for corresponding application PCT/EP2017/052424 filed Feb. 3, 2017; dated Apr. 18, 2017.

* cited by examiner

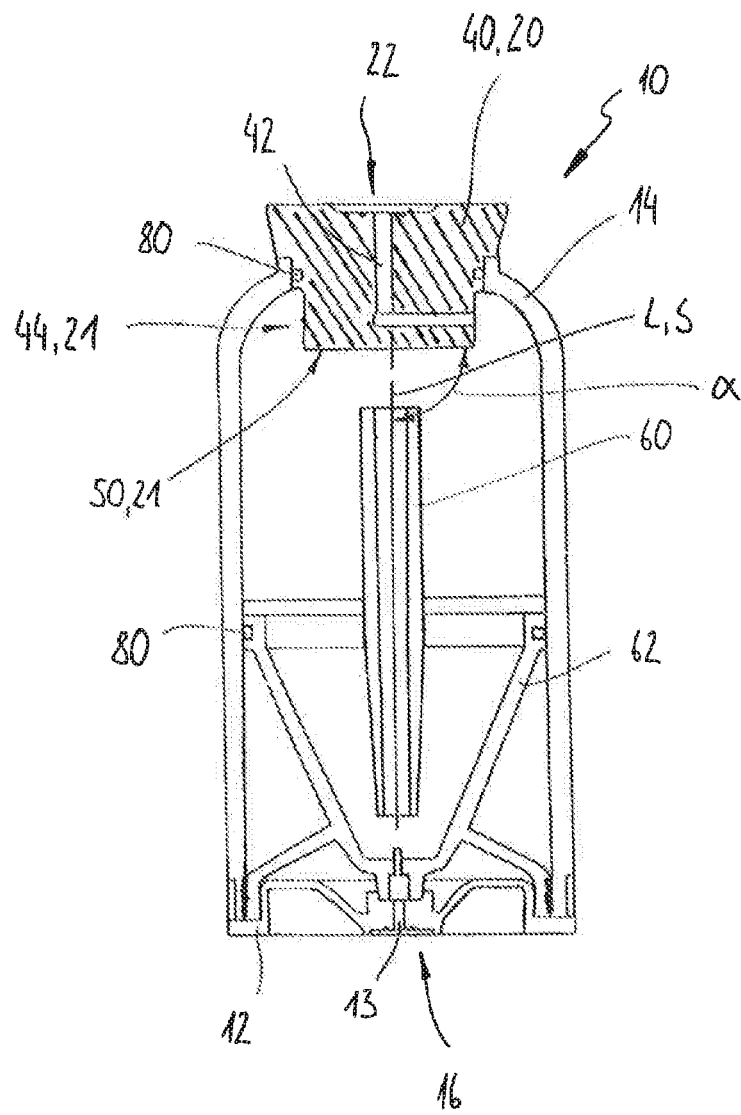

POWDER CHAMBER, CLOSURE FOR A POWDER CHAMBER, AND POWDER SPRAYING DEVICE

TECHNICAL FIELD

The present disclosure relates to a powder chamber, especially for or of a dental powder jet apparatus, a closure for a powder chamber as well as a powder jet apparatus.

BACKGROUND

In dental powder jet apparatuses as well as dental abrasive-jet apparatuses, dental powder stored in a receptacle or powder chamber, is supplied to a nozzle array of a hand-held piece connected thereto via a discharge lead, together with a gaseous carrier medium (for example air), generally in an admixture of pressurized water. According to a first known powder chamber design, air is introduced into the powder chamber from the top, according to a second variant, the air is introduced into the powder chamber from the bottom. It is especially the second type, which, for example is described in detail in EP 2 193 758 B1, featuring a very uniform stream of a powder-air-mixture.

However, the problem therewith resides in that the powder or powder particles, respectively, become electrostatically charged due to friction to each other or the chamber wall in the powder chamber. The electrostatic charge may then become high enough, for the powder to no longer be sufficiently free-flowing. Thus, a uniform stream of the powder-air-mixture, which is required for effective and gentle tooth cleaning, is no longer assured. This effect especially occurs with powders having small particle sizes, e.g. in a range of smaller than 12-25 µm. As clinical development turns to finer and more light-weighted powders, influence of electrostatic charge increases. While this problem is neglectable with known larger-sized powders having a mean diameter of about 65 µm and a density of more than 2 g/cm$^3$, with recent powders, such as e.g. of erythritol, having a density of appx. 1.45 g/cm$^3$ and a mean particle diameter of about 12 µm, turbulences of the powder in the powder chamber comes to a standstill in commercial powder jet apparatuses by electrostatic forces.

In EP 2 193 758 B1 it has been attempted to tackle this problem by means of the shape of the powder chamber. In EP 0 119 021 B2, powders are used, which are appropriately large (>80 µm).

DE 1 773 414 also addresses the problem, suggesting a vacuum dosing and mixing unit for fine pulverulent materials becoming electrostatically charged, preferably dental materials, consisting of storing containers for the goods to be dosed, at the bottom outlet apertures of which, preferably tapering in comparison to the receptacle cross section, dosing chambers are arranged, which are formed as recesses of a dosing roller, the bottom of the dosing chambers being formed in a design air-permeable to the electrostatically charging powder. By establishing pressure difference, electrostatic charge of the powder is to be counteracted. However, this solution is technically complex and does not eliminate the root cause of the problem, i.e. the electrostatic charge.

BRIEF SUMMARY

The disclosure provides a powder chamber, a closure for a powder chamber as well as a powder jet apparatus, which overcome the above-mentioned disadvantages, and provide a simple and low-cost way to provide optimum flowability of the powder in a powder chamber.

According to the disclosure, a powder chamber, especially for or of a dental powder jet apparatus, comprises at least one conductive region, which is formed electrically conductive, wherein the at least one conductive region comprises a contact surface, which is formed or arranged within the powder chamber, respectively. The powder chamber is designed for receiving or storing a powder, such as it is used for dental powder jet cleaning, in its interior, respectively. Moreover, the powder chamber suitably comprises an inlet for (pressurized) air as well as an outlet for the powder-air-mixture. Thus, the powder chamber is not only a pure "powder storage", but is also especially for providing a powder-air-mixture as uniform as possible, such as it is required for tooth cleaning. In the interior of or within the powder chamber, respectively, the electrically conductive contact surface is now advantageously formed or arranged.

The electrically conductive region or the contact surface cause the existing electrostatic charges, on the one hand, to be able to be discharged in a controlled manner and, on the other hand, for the charges generally caused by frictional electricity, to be able to be avoided. The reason for the electrostatic charges of the powder particles especially is the frictional electricity, which is a special type of contact electricity. When turbulencing the powder particles in the powder chamber, the powder particles hit each other— "rubbing against each other"—and—consequently become electrostatically charged. When contacting or impinging the wall of the powder chamber, respectively, the same effect occurs. With conventional powder chambers, there is no possibility to dissipate the electrostatic charge, as the walls of the known powder chambers are fabricated from plastics, which act as insulation. In other respects, there are no appropriate devices either, to tackle the problem of electrostatic charge of the powder. Even if it is assured that the powder, which is in the powder chamber, has been freed of charge, for example by using metallic leads/devices when filling the powder chamber, this does not prevent recharging from occurring by the already described effects. The consequence is that the powder becomes clumped in the powder chamber or adhered on the walls of the powder chamber, thus hampering formation of turbulence thereof, or even make it impossible. A problem resulting therefrom especially resides in that the powder stream or the powder-air-mixture, respectively, may no longer be sufficiently regulated or controlled, respectively. Moreover, a major amount of powder residue remains in the powder chamber, which may not be used up.

In that the powder chamber now comprises the conductive region or the contact surface, respectively, this disadvantage from state of the art can efficiently be overcome. I.e. specifically, existing electrical or electrostatic charges, respectively, of the powder particles may be dissipated, and in that the contact surface of the guide region is arranged within the powder chamber, it may be avoided for the flying powder particles to become electrically charged at all to a substantial degree. Said powder chamber is advantageously dimensioned, positioned and formed such that it will be "hit" by the powder particles swirling around. It may thus receive the electrical charges thereof and dissipate them via the conductive region. With this, any blocking of the powder or clogging of the powder chamber, respectively, may be avoided, especially when using fine powders having a mean particle diameter of less than about 50 µm, that is e.g. about 12-25 µm or even smaller. In such a powder chamber, modern powders, such as e.g. from or comprising erythritol having a density of about 1.45 g/cm$^3$ and a mean particle diameter of about 12 μm, may smoothly be employed, without a blockage occurring.

According to different embodiments, the contact surface has a specific surface resistivity in a range of about $10^{12}$ to $10^2 \Omega$, preferably below $10^9 \Omega$. The surface resistivity of materials and the dissipation resistivity of installations in relation to a reference potential (e.g. ground) have essential influence on the ESD protection (Electrostatic Discharge). Friction on bodies causes charge. Materials having sufficiently low surface resistivity, on the one hand, provide for the height of the charging voltage to be minimized, and, on the other hand, the electrostatic charge to be able to be decomposed again. The dissipation resistivity of installations provides for the electrostatic charges to be able to become discharged in relation to the ground reference potential, and thus no impermissibly high charges may occur. Thus, dissipation resistivity may reduce high voltages in a controlled manner. For this, the conductive region may, for example, comprise high-impedance resistances (100 kΩ-1 MΩ), which may be connected parallel or in series, as required. By the high resistance, any sudden current pulse is avoided, and the existing energy slowly decomposes. It is preferred, that the contact surface is formed as being statically or antistatically dissipative, respectively, conductive or even conducting. As statically dissipative, materials are referred to, which have a surface resistivity between $10^9$ to $10^{12} \Omega$. Materials having a surface resistivity in a range of $10^6$ to $10^9 \Omega$ are referred to as being statically conductive. Materials having a surface resistivity between $10^2$ to $10^5 \Omega$ are referred to as being conductive, and materials having a conductivity of $10^4$ to $10^2 \Omega$ are referred to as being conducting.

For example, part or portion of the inner wall of the powder chamber is formed as a contact surface or comprises said contact surface. Eventually, the complete inner wall of the powder chamber could be formed as a contact surface or may form said contact surface, respectively.

It is also conceivable for the contact surface or the guide surface, respectively, to be arranged spaced apart from the inner wall of the powder chamber. For example, the conductive surface is arranged immediately in front of or in a set distance from an outlet, from which the powder exits.

While the contact region is formed such that it will be contacted by powder particles swirling around, the conductive region is predominantly for dissipating or reducing the electric charge, respectively. The contact and conductive regions may be formed in multiple parts, especially in two parts, but may also be formed in one part. The volume resistance then is in a range common to the materials used. As materials for the conductive region, most different metals, such as aluminum, steel, copper and the like, may be used. However, especially preferred are modified plastic materials, which have the above-mentioned surface resistances, wherein suitable base materials are, for example, polyoxymethylene (POM) or polyethylene (PE). For increasing conductivity, for example, graphite may be added to the plastic materials. For modifying conductivity, the following materials may furthermore be added or may be used: carbon black, carbon fiber, graphite, metal powder, steel fiber, and/or nanoscale fibers. It has been proven sufficient for the contact region to be formed at least statically dissipative, i.e. to have a surface resistivity between $10^9$ to $10^{12} \Omega$. A conductivity, such as e.g. of metals, generally is not required. The conductive region may be or may comprise a cable or a conduction, respectively. However, the conductive region may as well be formed/provided by a part or portion of the powder chamber itself. According to one embodiment, the powder chamber may comprise a plurality of conductive regions (for example 2, 3, 4, 5, 6 or more), which eventually are connected among each other in an electrically conducting manner. The conductive regions are then arranged or formed, respectively, e.g. at different locations in/at the powder chamber, for example laterally, on top and at the bottom etc.

Basically, the person skilled in the art, means under a modified plastic material, such a plastic material, which is electrically conductive by the addition of an additive material. It is especially provided for the electric conductivity to be adjusted by the addition of the additive material, which is selectively adjusted, and preferably is adjusted depending on the particle size of the intended powder in the powder chamber. Especially preferably, it is provided for the conductor region and/or the contact region to be fabricated, at least mostly, i.e. for more than 70%, preferably for more than 80% and especially preferably for more than 90% of a modified plastic material.

According to one embodiment, the powder chamber comprises a chamber wall, which is fabricated of a non-metallic material, especially a transparent plastic material, wherein preferably a portion of the chamber wall is formed as a conductive region. Eventually, even the entire powder chamber may be formed as a conductive region. In this context, it may be mentioned that the powder chamber may be a powder chamber, which is arrangeable at a powder jet apparatus, and e.g. may be replaced (for example, if it is empty). However, it may also be a powder chamber, which is fixedly integral with a powder jet apparatus. It is preferred for the chamber wall to be fabricated of the transparent material, especially the transparent plastic material, as then the powder filling level and proper mixing may be monitored.

According to a preferred embodiment, the powder chamber is replaceably formed and has an essentially bottle-shaped shape, comprising e.g. an essentially cylindrical, rotational symmetric hollow body, which comprises a cover or closure, via which filling with powder is possible. According to one embodiment, it is not required for the entire powder chamber to be transparently formed, but, for example, solely a slit-shaped region preferably extending along the high axis, which is formed such that a powder filling level may be monitored.

According to one embodiment, the conductive region comprises a connecting region, which is formed for grounding the conductive region. It is thus assured for even the conductive region itself to be able to deliver or transfer, respectively, its electrical charge. For this, the connecting region itself preferably may also be formed in an electrically conductive manner. It is preferred for the connecting region to be arranged at an exterior side or forms an exterior side of the powder chamber, respectively. According to one embodiment, an exterior portion, for example, is formed at an exterior side of the powder chamber as a connecting region. The conductive region suitably extends across a complete wall thickness of the chamber wall and, at the same time, comprises the contact surface, which is formed within the powder chamber, and the connecting region, which is arranged exterior of the powder chamber. In other words, according to this variant, at least one portion of the chamber wall is the conductive region.

As already set forth, the powder chamber suitably has a closure for closing the powder chamber, wherein the closure, according to a preferred embodiment, comprises or forms the conductive region, or is formed as such, respectively.

Thus, a powder chamber having an ESD closure is preferred. The closure has been proven to be ideal, as is it not required for it to be transparently formed, and representing an additional component, which may easily be replaced or supplemented. Known powder chambers may thus be simply and cost-effectively upgraded. Addition of materials to increase conductivity of plastic materials, such as z.B. graphite or carbon fibers, commonly reduces transparency characteristics thereof, at high concentrations of such additions for increasing conductivity, they may even become intransparent.

The closure may be a separate component, which can reversibly be released from the powder chamber. In addition, one embodiment not only allows the closure to be regularly replaced, but also allows the conductor region to be fabricated as a separate component. Preferably, the conductor region of the powder chamber, especially the closure, represents a portion between 5% and 50%, preferably between 5% and 35% and especially preferably between 5% and 10% of the total volume of the powder chamber sealed with the closure. Preferably, the closure can be clipped or bolted to a base body of powder chamber.

It is especially preferred that the closure is arranged such that it is properly hit by the powder particles, especially by those that do not immediately re-exit the powder chamber. Preferably, the closure, for example, is arranged opposite to an air inlet of the powder chamber or (in relation to a high axis/longitudinal axis of the powder chamber) in an upper region of the powder chamber.

According to one embodiment, the closure is formed of plastic material and has a core of an electrically conductive material, e.g. metal. The core is not required to be completely surrounded by plastic material, but may form the contact surface, thus enabling direct contact with the powder particles. The same applies to the connecting region, which may also be formed of the core, thus enabling grounding of the conductive region/core.

According to another embodiment, the core may as well be completely surrounded by plastic material, the plastic material itself then provides the properties required of the contact surface of the conductive region, i.e. acting non-insulating, so that charge/discharge will be assured.

According to another embodiment, the closure comprises an electrically conductive surface. Thus, the conductive region is formed of the surface of the closure. Such a conductive region, for example, may be formed as a coating. Alternatively, a conductive region of such kind may also be made of varnishing or vapor deposition.

According to a preferred embodiment, the closure is formed of a plastic material, which comprises a plurality of electrically conducting particles, which may increase conductivity thereof. Preferred plastic materials or respectively preferred means for increasing conductivity have already been mentioned in the context with the conductive region and herein apply analogously and appropriately.

According to another embodiment, the powder chamber has a deflector surface, which is designed to deflect and/or redirect a powder jet within the powder chamber, wherein the deflector surface preferably is formed as a contact surface. As has been initially mentioned, there are essentially two types of powder chambers, wherein in a first variant, the air, especially pressurized air, is laterally supplied from an upper part of the powder chamber, whereas, according to a second preferred variants, the air is introduced into the powder chamber from the bottom. In both cases, the powder chamber comprises an appropriate exit/outlet for discharging the powder-air-mixture. The deflector surface preferably is for deflecting the air/powder stream within the powder chamber, for example towards the exit or generally approximately transversely to a flow direction, to allow uniform turbulences. Thus, the deflector surface is a component, or a component within the powder chamber, respectively, which most frequently comes into contact with the powder particles flying/swirling around. It is thus especially advantageous for the deflector surface to be formed as a conductive region or contact surface, respectively. Especially by said deflection of the powder, high electrically discharge of the powder may be realized.

According to a preferred embodiment, the closure comprises said deflector surface. Depending on how the flight of powder is to be influenced within the powder chamber, the deflector surface, for example, is planar, but may also be formed as being curved, such as e.g. concave or convex. The surface roughness then is preferably selected such that, at the contact surface, advantageously no powder particles remain adhered, whereby conductivity or surface resistivity thereof, respectively, might negatively be influenced. Furthermore, the surface roughness is advantageously selected such that optimally dissipating the electrical charge from the charged powder particles occurs.

According to a preferred embodiment, the powder chamber comprises a guide element, especially a Venturi tube, wherein the guide element is designed for guiding a powder stream along a flow direction towards the deflector surface. The guide element suitably is a tube-shaped element, which extends along a longitudinal axis/high axis of the powder chamber. Below the guide element, the air inlet is arranged in some distance. The guide element itself is surrounded by powder. If (pressurized) air is now applied to the powder chamber, air is guided into the powder chamber via the inlet and surrounding powder is aspirated or entrained into the guide element, respectively. The guide element, in turn, then suitably guides a stream of powder and air (the powder stream, according to different embodiments, is 15 to 20 g/min and more) along the flow direction, which corresponds to the longitudinal direction of the guide element, and towards the deflector surface, where it is suitably deflected and will then be electrostatically discharged with great advantage.

According to preferred embodiments, the deflector surface is oriented in relation to the flow direction or the guide element, respectively, in an angle of about 20° to 90°, especially preferably in an angle of about 45° to 90°.

The powder chamber suitably comprises an insert, in which the powder is stored. According to one embodiment, the insert is formed and designed to receive the powder and to preferably guide or direct it towards the (air) inlet, which, according to preferred embodiments, is arranged in a bottom region or bottom element of the powder chamber. This, for example, will be accomplished in that the insert has a conical shape guiding the powder towards an inlet arranged at the bottom of the powder chamber. In a preferred variant, the powder chamber has a cylindrical, rotational symmetric base form and comprises a (eventually removable) bottom element and a closure. The insert suitably is arranged within the powder chamber. The above-mentioned guide element or Venturi tube, respectively, is also arranged within the powder chamber or is arranged directly at the above-mentioned insert. The insert may also be formed electrically conducting. During turbulences, the powder skims along said insert, such that it therewith forms an especially suitable discharge surface. The bottom element, which preferably comprises the above-mentioned air inlet, may in turn be replaceably formed expediently. The diameter of the powder chamber, e.g. is in a range of about 7 to 18 cm, the height (as measured along the longitudinal axis) is in a range of about 10 to 25 cm.

Suitably, the powder chamber comprises at least one mounting and/or arrangement zone, which is designed for mounting and/or for arresting the powder chamber and/or to arrange another component, wherein the connecting region preferably has, comprises or forms the mounting and/or arrangement zone. Suitably, the mounting and/or arrangement zone thus is part of the guide region or will be formed thereof, respectively.

According to a preferred embodiment, the closure comprises the mounting and/or arrangement zone or is formed as a mounting and/or arrangement zone, respectively. In such an embodiment, the powder chamber advantageously is arrested or braced via the closure into an appropriate powder jet apparatus, respectively, especially along the longitudinal axis of the powder chamber. With this type of arrest, not only the powder chamber as such is arrested, but also safe closing of the powder chamber by the pressure applied to the closure will be achieved. As the closure suitably comprises the electrically conductive region or is formed as such, respectively, grounding of the conductive region very easily occur. Such a closure or guide region, respectively, suitably comprises both the contact surface and the connecting region, wherein the connecting region advantageously is designed as a mounting and/or arrangement zone.

The disclosure also concerns a closure for a powder chamber of a dental powder jet apparatus, wherein the closure comprises or is formed as such an electrically conductive guide region.

Preferably, the closure also comprises an outlet/exit for a powder or a mixed powder/air respectively. According to a preferred embodiment, the closure comprises a deflector surface and a side surface, which is formed cylindrically and/or conically. The side surface then is formed such that it is arranged in an appropriate aperture of the powder chamber. Especially, for example, by the conical geometry, easy arrangement in the aperture as well as good sealing action may be provided. It is preferred for the outlet to be arranged in the side surface and to extend such that it leads to the outside at a top side of the closure, which preferably is essentially opposite to the deflector surface. Such a route may, for example, be realized by two appropriate bores in a cost effective manner.

Besides, all advantages and features, which already have been mentioned in relation to the powder chamber analogously and appropriately or inversely apply to the closure of the disclosure, respectively.

Under a closure, the person skilled in the art preferably means a separate component, which can reversibly be released from the powder chamber. Such an embodiment not only allows the closure to be regularly replaced, but also allows the conductor region to be fabricated as a separate component.

The disclosure furthermore pertains to a powder jet apparatus, especially to a dental powder jet apparatus or abrasive jet apparatus, respectively, wherein the powder jet apparatus comprises means for grounding or potential equalization, respectively, wherein the means are configured for grounding a powder chamber, which is arranged or arrangeable in or at the powder jet cleaning apparatus. Suitably, the powder jet apparatus comprises at least one mounting and/or arrangement zone, which is configured for cooperating with a mounting and/or arrangement zone of a powder chamber such that arresting/mounting and grounding, respectively, of the powder chamber, especially the conductive region thereof, may occur. The formation of the means for grounding or potential equalization, respectively, within the powder jet apparatus, for example in the form of appropriate leads, is not critical, and is basically known to the person skilled in the art, so that possible embodiments of grounding the powder jet apparatus herein will not be further detailed. However, it has been proven to be especially advantageous for the powder jet apparatus to be formed such that upon arranging or mounting the powder chamber, respectively, simultaneously grounding of the powder chamber via the powder jet apparatus will be allowed. Besides, for the powder jet apparatus according to the disclosure, all advantages and features analogously and accordingly inversely, respectively, which have already been mentioned in relation to the powder chamber and the closure.

Furthermore advantages and features will arise from the following description of an embodiment of the powder jet chamber or the closure, respectively, while making reference to the accompanying FIGURES.

DETAILED DESCRIPTION

FIG. 1 shows an embodiment of the disclosure in a sectional view, namely a powder chamber 10, comprising an essentially rotational symmetric sleeve or chamber wall 14, respectively. Said chamber wall 14 comprises an aperture, in which a closure 40 is arranged. The powder chamber 10 is sealed towards a bottom side by a bottom element 12, which comprises an inlet 13 for (pressurized) air. Accordingly, the closure 40 has an outlet 42 for a powder-air-mixture. Within the powder chamber 10 an insert 62 is arranged, which is for storing a powder not shown herein. The powder chamber 10 extends along a high axis/longitudinal axis L. Along the longitudinal axis L, in turn, a guide element 60 extends, which is designed to guide a stream of a powder-air-mixture along the flow direction S. A deflector surface 50 is oriented in an angle α of about 90° in relation to the flow direction S. The mixed powder/air is directed towards said deflector surface 50 by the guide element 60.

Advantageously, the closure 40 is simultaneously formed as a conductive region 20, wherein the closure 40 advantageously is formed of plastic material, and comprising a core of an electrically conductive material, a conductive surface and/or a plurality of electrically conducting particles. Especially, the deflector surface 50 thus is formed as a contact surface 21 of the conductive region 20. By the arrangement shown in FIG. 1 it is assured that as many as possible powder particles will contact the conductive region 20 or the contact surface 21, respectively, which simultaneously represents the deflector surface 50, whereby assuring discharge of as many as possible/all powder particles. The closure 40 comprises a side surface 44, which, depending on the embodiment, may also be formed as a contact surface 21. In the range of the side surface 44, also the already mentioned outlet 42 is arranged, which, in the embodiment shown herein, will finally be realized by two bores.

The powder chamber 10 also has two mounting or arrangement zones 16, respectively, wherein a bottom arrangement zone or mounting zone 16, respectively, is formed by the bottom element 12, whereas an upper arrangement zone or mounting zone 16, respectively, is formed by the closure 40. In both cases, the mounting or arrangement zones 16, respectively, are formed via appropriate recesses, into which a congruently shaped geometry of a powder jet apparatus may engage. Advantageously, the mounting or arrangement zone 16, respectively, of the arresting element 40 simultaneously is formed as a connecting region 22, which also is designed electrically conductive. Thus, potential equalization or grounding, respectively, of the conductive region 20, especially when arresting or mounting the powder chamber 10 into an appropriate powder jet apparatus, will reasonably be enabled in a constructive easy way. The powder jet apparatus, which is not shown herein, suitably has an appropriate arresting mechanism, biasing the powder chamber 10 along longitudinal axis L, the closure 40 thereby being forced onto the sleeve 14 such that it will safely be sealed. The closure 40, in relation to the sleeve 14, suitably is additionally sealed by a seal 80, for example an appropriately formed O-ring. A similar seal 80 may also be used with the insert 62 for sealing in relation to the sleeve 14.

The invention claimed is:

1. A powder chamber, comprising:
   one or more conductive regions, which are electrically conductive;
   wherein the one or more conductive regions comprise a contact surface, which is formed within the powder chamber;
   wherein the powder chamber comprises a chamber wall, which is formed of a non-metal material;
   wherein a portion of the chamber wall forms a part of the one or more conductive region;
   wherein the powder chamber comprises a closure for closing the powder chamber;
   wherein the powder chamber is for or of a dental powder jet apparatus;
   wherein the powder chamber comprises an inlet for pressurized air as well as an outlet for a powder-air-mixture;
   wherein the closure is arranged opposite to the air inlet of the powder chamber and wherein the closure is a portion of the one or more conductive regions; and
   wherein an entirety of the one or more conductive regions of the powder chamber represents a portion of between 5% and 50% of the total volume of the powder chamber sealed with the closure.

2. The powder chamber according to claim 1,
   wherein the contact surface comprises a surface resistivity of $10^{12}\Omega$ or less.

3. The powder chamber according to claim 1,
   wherein the conductive region comprises a connecting region, which is configured for grounding the conductive region.

4. The powder chamber according to claim 1,
   wherein the closure is formed of plastic material, and
   wherein the closure comprises a core of an electrically conductive material, an electrically conductive surface and/or a plurality of electrically conducting particles.

5. The powder chamber according to claim 1,
   comprising a deflector surface, which is designed for deflecting/deviating a powder jet within the powder chamber, wherein the deflector surface is formed as the contact surface.

6. The powder chamber according to claim 5, wherein the closure comprises the deflector surface.

7. The powder chamber according to claim 5, comprising a guide element, wherein the guide element is configured to guide a powder stream along a flow direction towards the deflector surface.

8. The powder chamber according to claim 1, comprising at least one mounting and/or arrangement zone, which is configured to mount and/or to arrest the powder chamber and/or arrange another component, wherein the conductive region comprises the mounting and/or arrangement zone.

9. The powder chamber according to claim 8,
   wherein the closure comprises the mounting and/or arrangement zone, or is formed as a mounting and/or arrangement zone.

10. The powder chamber according to claim 1, wherein the closure is formed of plastic material and comprises a core of an electrically conductive material or a conductive surface.

11. The powder chamber according to claim 1, wherein the contact surface is formed as being statically or antistatically dissipative or conductive having a surface resistivity between $10^6$ to $10^{12}$ Ohm.

* * * * *